Aug. 13, 1935.  E. A. ROCKWELL  2,011,162
LIQUID LEVEL INDICATOR
Filed June 8, 1931  2 Sheets-Sheet 1
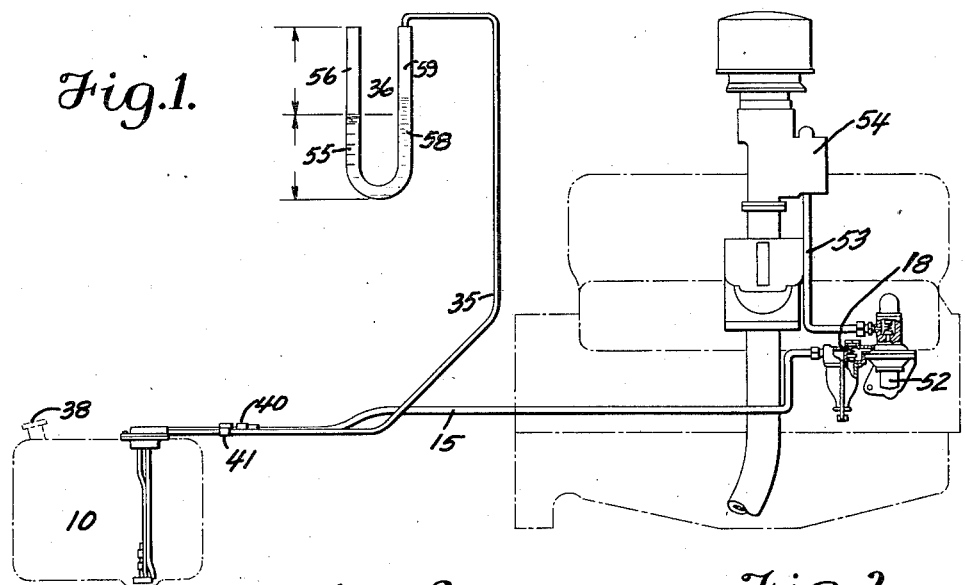
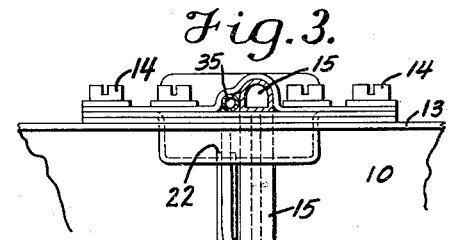
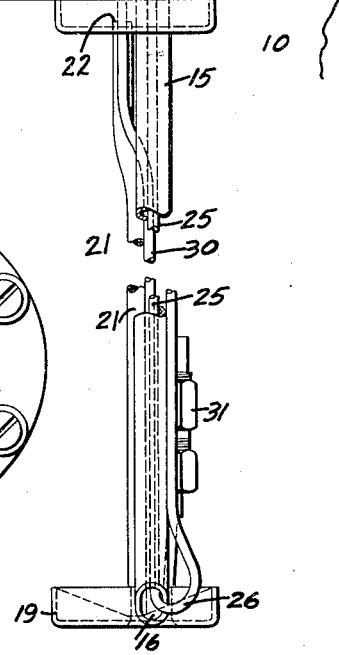
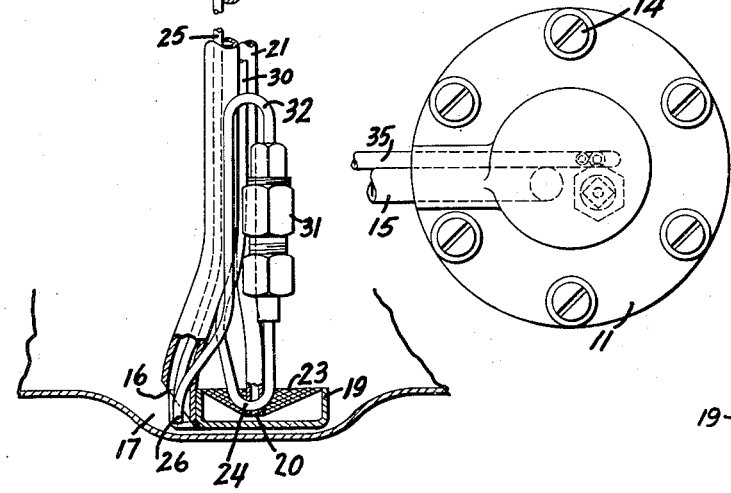
INVENTOR
EDWARD A. ROCKWELL.
BY
ATTORNEY Aug. 13, 1935.  E. A. ROCKWELL  2,011,162
LIQUID LEVEL INDICATOR
Filed June 8, 1931   2 Sheets-Sheet 2
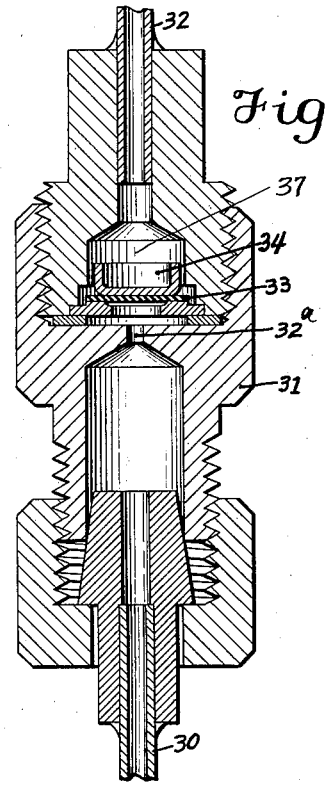
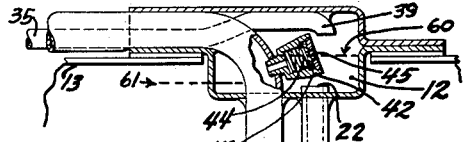
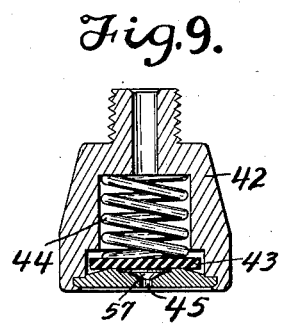
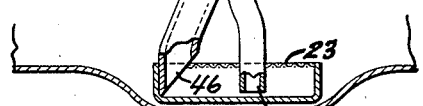
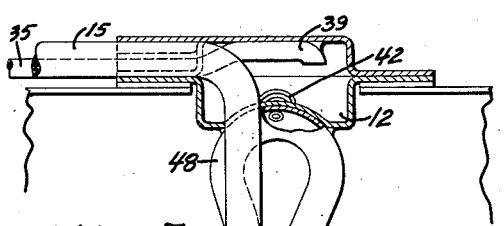
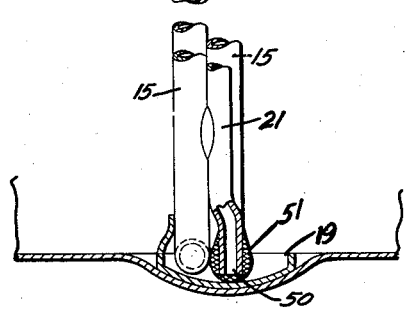
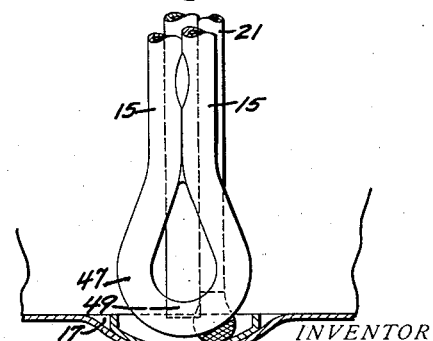
INVENTOR
EDWARD A. ROCKWELL.
BY
ATTORNEY Patented Aug. 13, 1935

2,011,162

UNITED STATES PATENT OFFICE 2,011,162

LIQUID LEVEL INDICATOR

Edward A. Rockwell, Chicago, Ill., assignor to Patent Engineering Corporation, New York, N. Y., a corporation of Delaware Application June 8, 1931, Serial No. 542,884

7 Claims. (Cl. 73—54)

This invention relates to improvements in liquid level indicators of the hydrostatic type for indicating the quantity of liquid in a container or tank, and more particularly to such indicators where the indicating instrument or gage is located at a distance from the tank.

The present invention relates more specifically to indicators of the suction hydrostatic type wherein the gage or indicating member is actuated by vacuum. Such indicators may be divided into two general types.

The first type employs the vacuum gage connected directly to the suction tube or pipe for withdrawing the liquid from the container and this connection is made at a point above the surface of the liquid whose depth is to be measured. This point of connection is the datum line, and the gage only reads correctly when there is no flow in the suction tube for the reason that during the flow the gage will indicate the total vacuum necessary to cause the flow of liquid in addition to that necessary to lift the liquid to the datum line. Such indicators are not suitable where there is a constantly changing rate of flow of the liquid, and are subject to variation because of temperature changes and because of any state of change in the character of the liquid while flowing or standing in the suction pipe. Such indicators must have a valve in the suction pipe to hold the level of liquid to be measured, when no liquid is being withdrawn from the tank.

The second type of indicator is that in which the vacuum gage is connected to a liquid column not in the suction pipe but forming part of the liquid whose height is to be measured. A connection between the upper part of this column (above the liquid level and between it and the gage and forming the datum line) is made to the suction pipe so as to constantly correct the condition existing above the column in the space between it and the gage. This arrangement will give correct readings regardless of the flow of liquid through the suction pipe, and if a constriction or valve is placed in the aforesaid connection between the liquid column and the suction pipe, this type of indicator can be made to register approximately only the vacuum necessary to balance that portion of the liquid column between the datum line and the surface of the liquid to be measured which depends upon the amount of liquid in the container.

This second type, when there is no flow, must also depend upon a shut-off or check valve in the suction pipe in order to maintain the reading on the gage. Valves for this purpose are undesirable for several reasons; in the event they leak, the gage will read incorrectly and will usually read "full" instead of "empty". The presence of such valves prevents the blowing out of the suction pipe often necessary in servicing.

Obviously, both of these types fail if all the liquid is drawn out of the tank, as in this event the liquid in the suction pipe in the first type or the liquid column in the second type is no longer sealed and falls back into the container. This breaks the vacuum on the gage, causing it to read "full" with an empty tank.

An object of the invention is to provide a liquid level indicator that will be free from the aforesaid objections and from inaccuracies caused by the expansion of air or vapor within the indicator and its associated parts and piping, and a device that will be free from other objections heretofore met with in indicators of the hydrostatic type, all as more fully hereinafter referred to.

Another object is to provide an indicator that is simple and cheap to construct and which may be easily installed on automobiles where it is desirable to mount the gage proper upon the instrument board in front of the driver, the other parts being assembled as a tank unit and placed in the fuel tank at a distance from the gage.

Another object is to provide a level indicator wherein float valves are eliminated, and which is adapted for use in connection with a fuel pump or suction device.

Another object is to provide an indicator that may be used with tanks and piping where it is possible to blow out the piping in the usual manner for freeing the same from obstructions, without injury to the gage.

A further object is to provide an indicator wherein the parts associated with the tank or container holding the liquid whose level therein is to be indicated on the gage, are compactly assembled into a tank unit adapted to be easily attached to the wall of the tank so as to project only slightly therefrom, particularly if placed on the top of the tank. This is of importance with automobile tanks placed below a sill or cross member of the chassis. In such installations anything projecting from the top of the tank makes it necessary to drop the tank below the sill which is objectionable.

Other objects will be apparent from the following specification in which, by way of illustration, the liquid level indicator is described as applied to the fuel tank of an automobile, the gage being located on the instrument board. Obviously, many modifications may be made in the construction and assembly herein described, without however, departing from the appended claims.

In the accompanying drawings:—

Figure 1 is a diagrammatic illustration, partly in elevation and partly in section, of the complete liquid level indicator as applied to an automobile showing the complete assembly and operating connections to the fuel pump;

Figure 2 is a view, partly in section, of the compensator or tank unit of the indicator;

Figure 3 is a view on the line a—b through the casing Figure 2, with the pipes broken away to show the relative arrangement of same;

Figure 4 is a plan view, looking down on the top of the unit Figure 2;

Figure 5 is a sectional view of the valve shown in Figure 2;

Figure 6 is a view, partly in section, of a modification of the tank unit Figure 2;

Figure 7 is a view, partly in section, of another modification of the tank unit Figure 2;

Figure 8 is another view of the unit shown in Figure 7; and

Figure 9 is an enlarged sectional view of the valve 42 in Figure 6.

In Figure 1, the numeral 10 denotes the fuel tank of an automobile having therein the compensator or tank-end of the indicator hereinafter termed the tank unit, as shown in Figure 2.

The tank unit comprises a flanged casing 11 constructed in any suitable manner and having therein a chamber 12, lying partly within the tank 10, the casing being secured to the apertured wall 13 of the tank by any means such as the bolts or screws 14. This enables the device to be used on tanks without sacrificing head room, and provides that the liquid level in the chamber 12 shall be practically on a line with the upper wall 13 of the tank.

Secured to the casing 11 is the suction pipe 15 which extends through the chamber 12 and downwardly into the tank 10 as shown, its lower end being preferably cut at an angle as shown at 16 and being positioned in a sump 17 in the tank 10. The end 16 should be above the loop 26 forming a liquid trap in the compensating tube to be presently described, to prevent ingress of air to chamber 12 when the tank is empty. The pipe 15 extends outwardly from the tank unit and may be of sufficient length to connect to the usual fuel pump assembly shown in Figure 1 which may be of any suitable type. A check valve 18 is usually found in such pumps and opens toward the pump, preventing the return of liquid through the suction pipe 15, although this return would not affect the operation of the gage.

Secured to the bottom of pipe 15 and preferably supported thereby is the cup or catch-basin 19 which fills with liquid and forms a liquid seal for the bottom end 20 of pipe tube or member 21 which extends upwardly, the end 22 thereof opening into chamber 12. Surrounding the end 20 of this pipe is the screen 23 secured to the pipe and the upper edge of cup 19 to prevent dirt and water from entering the pipe and thereby getting into chamber 12. This screen is so shaped and positioned in tank 10 as to be washed by the movement of the liquid in the tank so that dirt and water thereon will be deposited in the sump 17. The screen being applied as shown in Figure 2 permits the bottom loop 24 of the pipe 30 to be brought near the bottom of the pipe 21 and soldered thereto or to the screen.

The cup 19 always forms a liquid trap about the lower end of the tube or member 21, the liquid in which will constitute a liquid column, even if the level of liquid in the tank should fall below the bottom of 19 and even if all of the liquid is drained from the tank, provided the vacuum in chamber 12 above the liquid column is sufficient to support it.

The small pipe 25 being bent to form the loop 26 forming a liquid trap, the end 27 is thrust inside of pipe 15 until it strikes the bend 28 therein. The exact position of end 27 is not important provided it is subject to the suction in pipe 15, but Figure 2 shows the average relative position of this end 27 in relation to the end 29 of pipe 30 which together with 25, forms a connection between the suction pipe 15 and the chamber 12.

The end 29 of the pipe 30 projects upwardly in chamber 12 a definite distance in order to definitely determine the liquid level therein; liquid in this chamber will rise to the upper edge of the end 29 and overflow, the liquid level being maintained at this point as hereinafter described, and forming the datum line for the indicator.

The pipe 30 extends downwardly as shown, having the loop 24 forming a liquid trap therein, and then extends upwardly and connects to the back-pressure valve 31. The pipe 25, having the trap 26, extends upwardly outside pipe 15, and has bend 32 therein and then extends downwardly and connects to the top of valve 31.

Valve 31 performs no function in connection with the indicator per se except to prevent back-pressure, and is placed as shown merely to permit blowing out the fuel supply pipe 15, as hereinafter referred to. This valve may be of any suitable construction but as shown in Figure 5 has a restriction orifice 32a in its body opening against the movable disc 33, which opens upwardly, Figure 5, and is held normally against its seat by gravity and the weight 34.

The restriction orifice 32 must be much smaller than the bore of pipe 21 and may be placed anywhere in the connection formed by pipes 25 and 30 between pipe 15 and chamber 12 when valve 31 is not used. When valve 31 is used, it merely forms a convenient means of inserting this restriction in the connection aforesaid which comprises the pipe 25, trap 26, trap 24 and pipe 30. Trap 24 is not absolutely essential and could be omitted. This connection between the suction means 15 and the liquid column in 21 is hereinafter termed a compensating tube. The restriction orifice 32a is employed to prevent the too-rapid withdrawal of fluid and vapor from the chamber 12, and eliminates the necessity of accurately determining the relative sizing of the pipes 30, 21 and 27.

In the event the piping on the automobile is blown out, as often done to free the same from dirt and water, the air will enter the tank via pipe 15, but by reason of the liquid trap about the end 20 of pipe 21 cannot find its way through said pipe into chamber 12 and then via pipe 35 to the gage. If air enters pipe 25 of the compensating tube at the end 27, it will pass downwards therein to the chamber 37 in the valve 31 but can go no further because the disc 33 is on its seat. Therefore, when blowing out the system, no air can reach the chamber 12 and pass to the gage 36 which is in consequence protected from damage. The tank 10 of course is vented to the atmosphere through the usual hole in the filler cap 38.

The gage pipe 35 extends from chamber 12, its end 39 being turned downwards as shown in Figure 2 so that any moisture may drip out of same. The outer end of 35 connects to the gage or indicating means 36.

It will be observed that the device shown in Figure 2 forms a complete tank unit and may be placed on the tank assembly as such, without the necessity of having the gage 36 assembled and connected. The pipes 15 and 35 are conveniently clamped between the two sides of the casing 11 as shown in the drawings. The unit is connected by couplings 40, 41 to its associated pipes.

The modification of the tank unit shown in Figure 6 merely substitutes a valve 42 for the compensating tube as just described. Valve 42 has a disc 43 which is pressed outwardly by a spring 44 against a seat 57 communicating with the intake orifice 45 in the head of the valve body. The restriction orifice necessary in this form of compensating means is the hole 45, and the area of the valve seat should be of much greater cross section than that of the orifice. This valve performs a double function as presently described.

The bottom 46 of pipe 15 is cut off as shown, Figure 6, so that the end thereof is above the screen 23.

If the piping system is blown out, air entering via pipe 15 cannot reach the chamber 12, pipe 35 and gage 36, as the valve 42 only opens inwardly and pressure in pipe 15 only serves to close it more tightly. As the bottom of pipe 21 is sealed by reason of liquid in the cup 19 no air can enter 21.

If valve 42 should fail and permit the operating condition in chamber 12 to change, the gage will not read correctly. The liquid seal arrangement shown in Figure 2 is preferable for this reason.

A further modification embodying both the valve and a liquid seal is shown in Figures 7 and 8. Here the suction pipe 15 extends downwardly to the bottom of tank 10 and bending at 47 extends upwardly as shown, bending again at 48 and then extending downwardly, terminating at 49 slightly above the bottom of bend 47. The pipe 21 extends from the chamber 12 to a point 50 slightly below the bend 47 and is provided with a screen 51. The valve 42 is placed in the top of bend 48.

In operation, the tank unit being connected to the gage 36 and to a fuel pump 52 of any suitable type commonly used to supply gasoline via pipe 53 to the usual carburetor 54, the tank 10 is filled with gasoline. If the fuel pump is not operating the gasoline will flow upwardly in pipes 15 and 21 and some air will therefore be trapped in the chamber 12. The gage 36 connected to this chamber will now register "full" and some of the indicating liquid 55 therein will be forced up into the overflow space 56.

When the pump starts it draws gasoline up the pipe 15 which creates a suction on the end 27 of the tube 25, which being connected to the tube 30 (via valve 31), the latter having its end 29 in chamber 12, will gradually exhaust the air from the chamber 12, pipe 35 and gage 36. This gradually draws the liquid 55 in the gage downward. At the same time gasoline entering the pipe 21 at 20 ascends and overflows at 22 into the chamber 12, filling the same up to the top 29 of pipe 30.

When the gasoline reaches the top 29 the datum line of the device is established and this level remains practically constant, a small quantity of gasoline being sucked through the compensating tube into 15.

This withdrawal of gasoline together with any air or vapor that may be in the chamber 12 by the compensating means automatically and continuously compensates or corrects for temperature changes, for any vapors that may be present and for any differences that may occur in the gasoline level in chamber 12 while the fuel pump is not in use. The valve 31 plays no part in the operation of the device except the restriction 32 therein prevents too rapid suction on the chamber 12.

In the event the pipe line terminating in 15 is blown out, the valve 31 closes and prevents air from entering the chamber 12. This valve is preferably immersed in the gasoline in 10 as shown, to wet the valve member 33 (preferably of treated fabric) which operates best when immersed in liquid.

The modification shown in Figure 6 operates as just described except that instead of the compensating tube shown in Figure 2, the valve 42 is used. When suction occurs in the pipe 15, the valve 42 opens and permits the contents of chamber 12 to be withdrawn, including liquid, down to a datum line depending upon the location of the entrance hole 45 in the valve. If the valve 42 should leak, the device will not be properly sealed.

The modification shown in Figures 7 and 8 operates as previously described except that the valve 42 (which operates as described in connection with Figure 6) will, in case it leaks, only permit communication between the chamber 12 and a space within pipe 15 extending between the bend 48 and bend 47 as the latter forms a liquid trap. This is because the end 49 of 15 is trapped in the liquid in the sump 17 and the outgoing end of 15, that is, the end connected to the pump, is trapped by the liquid in the bend 47.

In both of the modifications Figures 6 and 7, the valve 42 acts to prevent air entering chamber 12 in case the piping is blown out as previously mentioned.

Usually by the time the tank is filled, the liquid 55 in the gage assumes a position on the scale which indicates the quantity of liquid in tank 10. This scale is usually graduated to read from "full" to "empty" as shown in Figure 1. The tube 58 may extend upwards as indicated at 56 to provide room for the liquid displaced by pressure during the initial filling of the tank where there is no liquid in cup 19. Usually 19 is sealed and the liquid 55 is not forced into the overflow space 56 by pressure, as just described.

It will be observed that the vacuum in chamber 12 registered by the gage will always be proportional to the hydrostatic head of gasoline from the surface of the liquid in the tank, to the datum line. If 60, Figure 6, is the datum line and 61 the liquid level the vacuum will always be equal to the column of liquid in the pipe 21 between 60 and 61. The gage is graduated according to this head, care being taken to mark the indications to read the actual depth of the gasoline in the tank, if the datum line is above the actual tank level.

While the three forms of the invention herein shown all have what is in effect a suction means comprising the pipe 15, obviously, this could be omitted and the compensating means (end 21 of tube 25) connected to any source of suction such as the intake manifold of an engine. As the compensating tube or pipe is quite small the very small amount of gasoline sucked through the pipe could be disregarded. When this is done, the main supply of gasoline may be taken out of pipe 15 which would then have no part in the operation of the indicator.

The different forms of the invention herein described all have the pipe 21 forming a liquid column, as well as a compensating means—the compensating tube of Figure 2 or the valve 42 of Figure 6 or 7. In all three forms the compensating means includes a restriction such as the orifice 32.

In some forms of the invention the chamber 12 may be part of the liquid column and could be a section of pipe 21. Pipe 35 may also be part of the column. The reason the liquid column is preferably provided with chamber 12 as shown is to provide a convenient place to trap fluid to form the datum line as well as provide an expansion space of considerable content in proportion to the small content of the pipe 35 so that any expansion of air or gas in the free space in 35 due to temperature changes will not seriously alter the liquid level forming the datum line. In this connection chamber 12 functions as a combination liquid trap and expansion chamber.

Loop 26 should be below the opening 16 into the pipe 15, that is to say, below the upper edge of the said opening.

The position of loop 24 is immaterial; the only reason it is brought down and into proximity to the end 20 of pipe 21 is because it may be soldered thereto and this soldered connection helps support the unit.

The relative position of loops 49 and the end 50 of pipe 21 is such that the end of the pipe is above the bottom of the loop.

What is claimed is:

1. In a liquid level indicator, a container, means to form a liquid column connected thereto, suction means separate from said first means for withdrawing liquid from said container, a suction operated valve operatively connected between said column and said suction means to permit back flow through said suction means to said container, and indicating means communicating with said column.

2. In combination with a tank, a unit structure adapted to be mounted in said tank comprising a casing forming a chamber, a suction pipe secured to said casing and extending downwardly therefrom and adapted to withdraw liquid from said tank, a gage pipe secured to said casing and communicating with the upper portion of said chamber, a member adapted to form a liquid column secured to said casing and extending downwardly therefrom and having its upper end in communication with the lower portion of said chamber, a tube connecting said suction pipe and said chamber, and a valve in said tube positioned below the bottom of said chamber and adapted to be immersed in liquid when said unit structure is mounted in a tank.

3. A unit structure adapted to be mounted in a tank comprising a casing forming a chamber, a suction pipe passing through the walls of said casing and through said chamber and extending downwardly therefrom and then upwardly to form a liquid trap portion below said chamber, said pipe having a bend above said trap portion, said pipe continuing downwardly from said bend and having its tank end terminating above said trap portion, a tubular member connected with said chamber and extending downwardly therefrom and terminating near the tank end of said suction pipe, and a valve permitting communication between said chamber and that portion of said pipe lying between the liquid trap portion and tank end thereof.

4. In a liquid level indicator, the combination with a tank adapted to hold liquid, of a suction pipe terminating in said tank, said pipe having two U bends therein within said tank, one above the other, the lower bend adapted to form a liquid trap in said pipe, a chamber, a gage connected thereto, means separate from said suction pipe adapted to conduct liquid from said tank to said chamber, and means adapted to maintain a constant liquid level in said chamber connected to said suction pipe.

5. In a liquid level indicator, a tank, a liquid column connected thereto, a suction pipe separate from said column and adapted to withdraw liquid from the tank, a passage between said column and pipe, a valve in said passage, and a constriction in said valve adapted to restrict the flow of fluid therethrough.

6. In a liquid level indicator, a container, means to form a liquid column connected thereto, a chamber connected to said column, suction means separate from said liquid column for withdrawing liquid from said container, a passage between said chamber and said suction means, said passage being continuous during all conditions of operation of the indicator, means for maintaining a constant liquid level in said chamber, indicating means connecting with said chamber and a valve in the passage between the chamber and the suction means adapted to protect said indicating means and to permit back pressure to flow through said suction means to the container.

7. In combination with a tank, a casing adapted to be mounted in a wall of said tank, a suction pipe passing through said casing into the tank and terminating near the bottom thereof, a chamber in said casing, a tubular means adapted to form a liquid column depending from said casing and in communication with said chamber and terminating near the bottom of said tank, a compensating tube connecting with said suction pipe at the point where it passes through said casing and extending downwardly below the bottom of said tubular member and thence upwardly terminating within said chamber, indicating means connected to said chamber and adapted to indicate fluctuations in subatmospheric pressure therein and a valve located in the compensating tube and adapted to protect the indicating means and permit back-pressure to flow through from the suction pipe to the tank.

EDWARD A. ROCKWELL.